INVENTORS
EUGENE S. ROCKS
HARRY J. SMITH
BY Arthur H. Serrell
ATTORNEY

3,419,967
GYROCOMPASSES

Eugene S. Rocks, Northport, and Harry J. Smith, Sea Cliff, N.Y., assignors to Sperry Rand Corporation, Great Neck, N.Y., a corporation of Delaware
Filed May 24, 1965, Ser. No. 458,146
U.S. Cl. 33—226                                    3 Claims
Int. Cl. G01c *19/38*

---

ABSTRACT OF THE DISCLOSURE

The sensitive element of a portable stationary-type gyrocompass floats in liquid in the binnacle enclosure. When the floated element is caged, a shoulder thereon above the liquid engages an interior flange on the enclosure, sealing off from the liquid an upper chamber which contains the upper end of the sensitive element with its alignment means, optical reference means, and gyro battery recharging connections, the latter making contact with external supply connections upon caging.

---

This invention relates to gyrocompasses of the portable stationary binnacle type having particular utility in theodolite apparatus used for surveying or for checking directional indicating equipment at sites remote from available power sources.

In the improved gyrocompass, the binnacle or housing provides a liquid tight chamber for a liquid in which a liquid tight directive assembly or element floats in a partially submerged condition with its center of gravity below its center of buoyancy. There is no constraint placed on the directive assembly in the improved structure as there is no bearing connection between the binnacle or housing and the directive assembly.

The free floating directive element or assembly of the improved structure includes a gyroscopic rotor, a source of electrical energy such as a rechargeable battery as well as an electric motor operatively connected to the gyroscopic rotor, and a circuit between the battery and the motor with an off-on switch in normally closed condition together with normally open contacts for supplying energy to recharge the battery when closed.

Under operating conditions where the directive assembly is floating with respect to the binnacle, the assembly is centralized with relation to the liquid chamber of the binnacle by magnetic coupling means having a magnet fixed to one of the parts with a field directed along a normally vertical center line and a piece magnetized by the flux field of the magnet fixed to the other part. As the chamber is cylindrical and the center line corresponds to its longitudinal axis, the coupling prevents the floating assembly from drifting into contact with the wall of the chamber. As there is no mechanical or electrical connection between the binnacle and floating assembly, the relation between the parts when uncaged is both frictionless and torque free. With no physical constraint between the partially submerged floating assembly and the binnacle in the improved instrument, it is unnessecary to control the temperature of the liquid. The liquid of the improved gyrocompass also provides the requisite damping for the directive element or assembly.

The improved gyrocompass is a North-seeking device uninfluenced by the earth's magnetic field that is adaptable for use with surveying instruments of the theodolite type having conventional telescope, base plate and tripod parts.

An object of the invention is to provide an inexpensive device of this character having a variety of applications for direction checking purposes that is readable soon after starting and is readily moved from one job location to another.

Figure 1A:
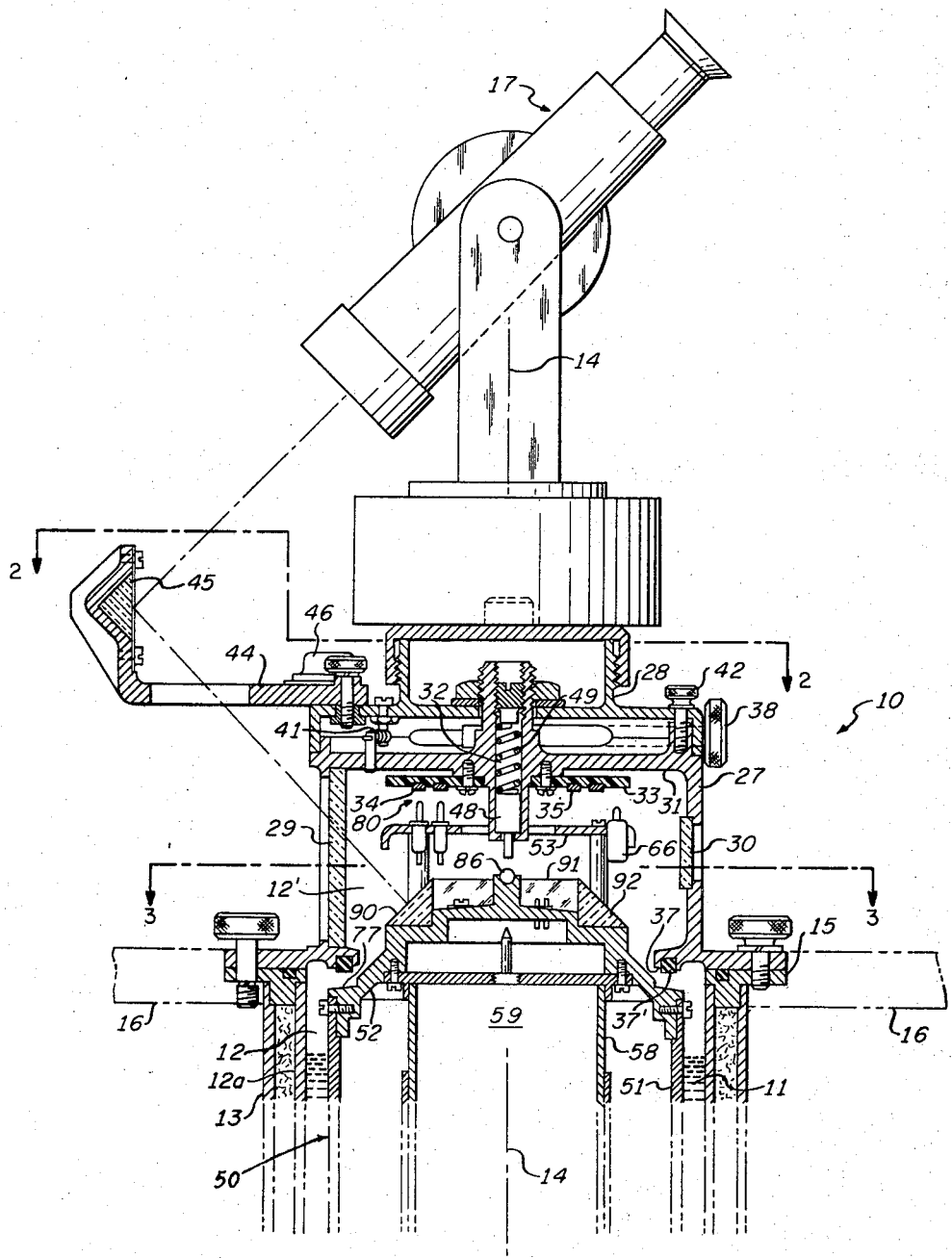
Figure 1B:
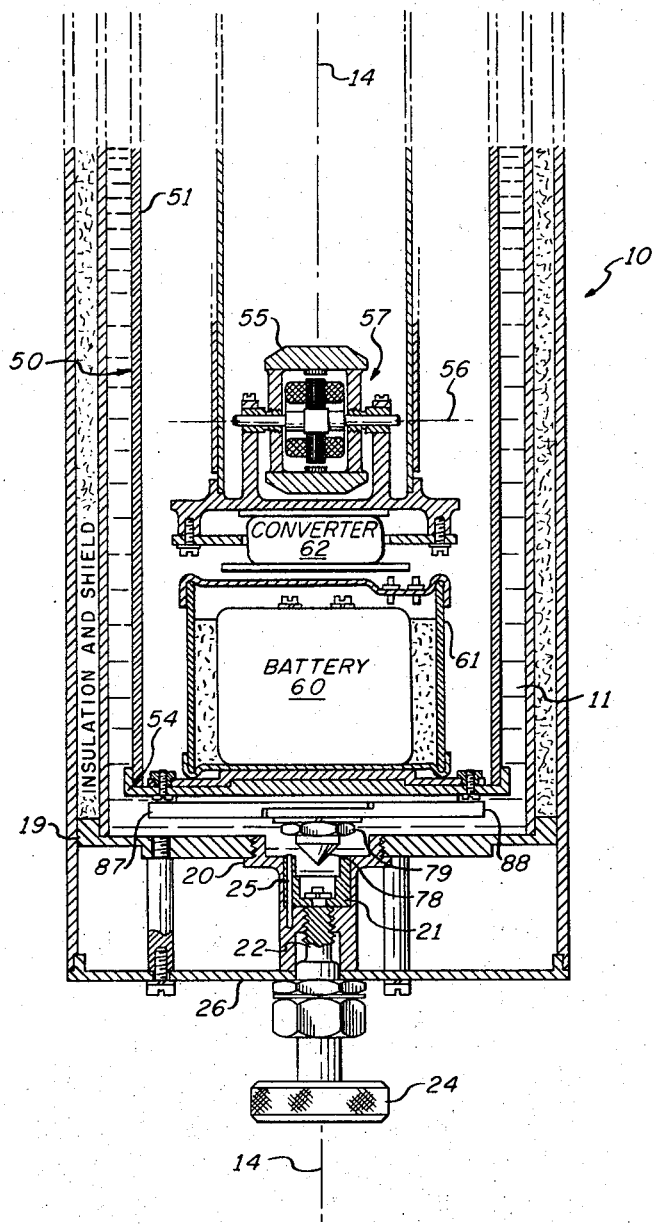
Figure 2:
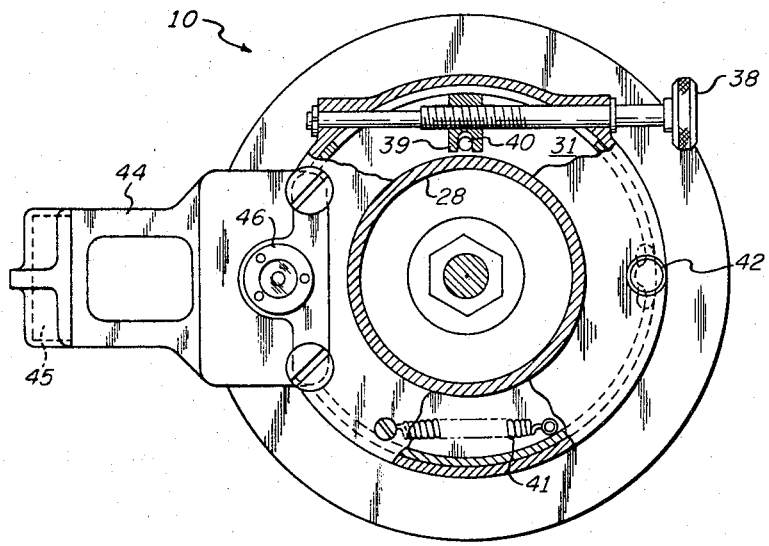
Figure 3:
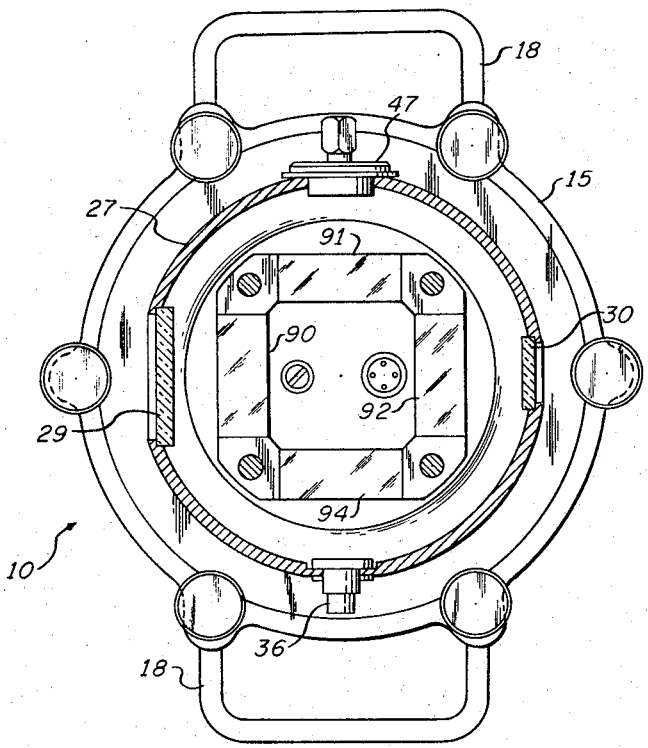
Figure 4:
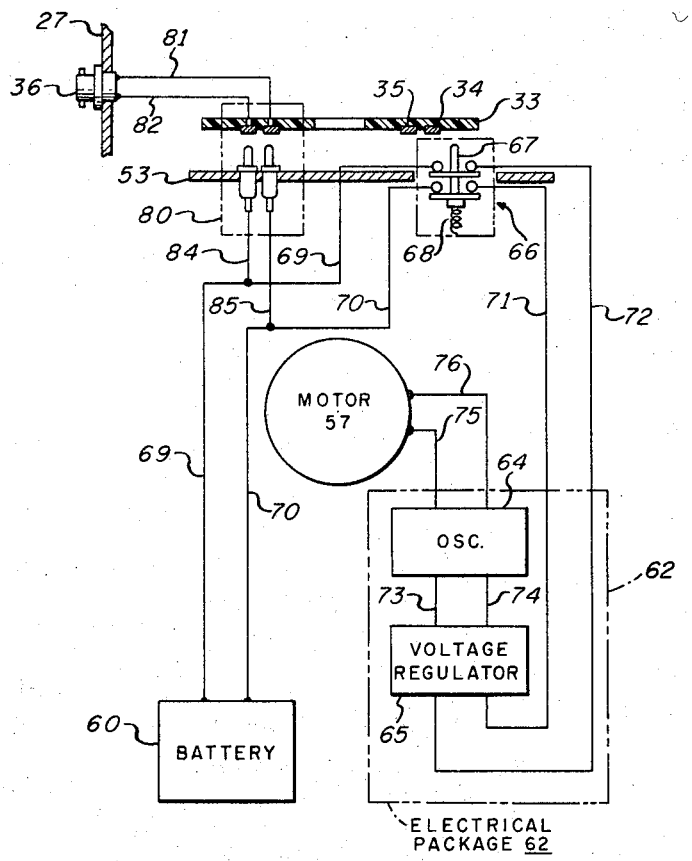
Figure 5:
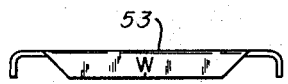

Other objects, structural details and advantages of the improved gyrocompass will become apparent in the following description of the subject invention in relation to the accompanying drawings wherein:

FIGS. 1(*a*) and 1(*b*) taken together present a vertical sectional view through the binnacle and directive assembly of the improved gyrocompass, FIG. 2 is a sectional view taken on line 2—2 in FIG. 1, FIG. 3 is a sectional view taken on line 3—3 in FIG. 1, FIG. 4 is a schematic view and circuit diagram showing the electrical components of the improved gyrocompass, and FIG. 5 is a detail side elevation of the compass plate.

As shown in FIGS. 1(*a*), 1(*b*), 2 and 3, the improved gyrocompass includes a portable binnacle generally indicated at 10 divided into lower and upper chambers 12 and 12' by an interior annular flange 37. The liquid component 11 of the combination is contained in the lower liquid tight chamber 12. This portion of the binnacle has the configuration of a closed end cylindrical container 12*a* whose longitudinal axis 14 is vertical. The upper portion of the container includes an external rim 15 that is open above the level of the liquid 11. Rim 15 is adapted to fit on a base plate 16 of the tripod of a theodolite structure whose telescope is indicated at 17. The container structure of the improved gyrocompass is formed of three nested cylindrical sleeves 12*a*, 13 and 51, intermediate sleeve 12*a* and interior sleeve 51 providing the liquid tight chamber 12. The sleeve 12*a* is made of a material which provides shielding of the float 50 and its electrical components from external magnetic influences. Between the sleeves 12*a* and 13 is a thermal insulation material for the liquid to isolate the same from the thermal influence of the atmosphere. Handles 18 extend from the rim 15, FIG. 3, to provide the grips necessary to locate the binnacle in place on the level base plate 16. In setting up the tripod of the theodolite to mount the binnacle on the plate, it will be appreciated that the plate is level and that accordingly the axis 14 of the chamber 12 of the housing or binnacle is vertical, spirit level 46 being provided for this purpose.

The bottom of the liquid chamber 12 is closed by an interior base plate 19 and a threaded mounting piece 20 for an axially movable cup 21. Motion is imparted to the cup 21 by manual adjustment of a screw member 22 having an exterior handwheel 24 at one end. The interior end of the screw 22 is free to turn in the cup 21 which is prevented from rotating about axis 14 by a cooperating guide and pin arrangement. As shown in FIG. 1(*b*), the pin of such a structure as indicated at 25 extends parallel to axis 14 and is fixed to piece 20. The mating guide of the structure is provided in the body of the cup 21 per se. The wheel 24 of the arrangement lies below a plate 26 closing the bottom of the binnacle in a position where it is readily accessible to the operator with the gyrocompass positioned on the base plate 16 of the theodolite. In the position of the parts shown in FIGS. 1(*a*) and 1(*b*), the cup 21 is retracted so that the caging means included in the structure is ineffective.

The binnacle or housing structure above the rim 15 and level of the liquid 11 includes intermediate and top cover parts respectively indicated at 27 and 28 that are angularly adjustable relative to one another through a small limited range about axis 14. Intermediate cover 27 fits the rim 15 of the chamber portion of the binnacle and is suitably fixed to it. As shown in FIGS. 1(*a*) and 3, the intermediate cover 27 includes oppositely disposed large and small side windows 29 and 30 and a top plate 31 with a cylindrical opening 32 normally aligned with the axis 14. A disc 33 of insulative material is suitably fixed to plate 31. Disc 33 includes two electrical conductors in the form of tracks 34 and 35 concentric to the axis 14 that are connected by suitable electric leads to an electrical socket 36. Cover part 27 also includes the fixed part of the caging means provided in the improved gyrocompass as shown in FIG. 1(a) by the interior flange 37.

The top cover part 28 of the structure fits snugly on the plate 31 for adjustment about axis 14 by means of a cooperating thumbscrew 38, FIG. 2, rotatably mounted on part 28, a threaded cam piece 39 and a pin 40 on plate 31 that engages the piece 39. The described parts are maintained in the axial relation determined by the setting of the screw 38 by tensioning means such as a spring 41 one end of which is fixed to the plate 31 and the other end of which is fixed to the adjustable cover part 28. In order to move the parts by thumbscrew adjustment, it is necessary to loosen the screw of a screw and groove fastening 42 shown in FIG. 2. The theodolite parts of the improved gyrocompass include an arm 44 fixed to cover part 28 with a prism 45 thereon. The telescope 17 of the arrangement is suitably fastened to the top of the cover part 28 to tilt about a horizontal axis so that a return image can be obtained using a suitable autocollimating attachment, thus providing an optical indication of the azimuth of the directive element or floating assembly of the improved gyrocompass by way of the prism 45, through window 29. A spirit level 46 on the arm 44 of the binnacle or housing indicates that the same is mounted with the axis 14 truly vertical and the surface of the liquid 11 located in a plane perpendicular thereto. The upper chamber portion 12' of the binnacle above the level of the liquid 11 is open to the atmosphere through a suitable vent valve structure 47, FIG. 3, included in the side wall of the cover part 27 to insure internal pressure equalization between the two chambers when the sensitive element is uncaged.

One of the components of the coupling means included in the improved combination to centralize the float assembly or directive element with respect to the binnacle or housing is provided by a cylindrical magnet 48 that is arranged with respect to the binnacle so that its flux field is directed along the axis 14. As shown in FIG. 1(a), the magnet 48 fits the opening 32 in plate 31 and is biased by spring 49 to a normal operating position with respect to the plate 31 in which one end of the magnet projects beyond the bottom flange provided in the plate. This structure permits the magnet 48 to move in a vertical direction against the influence of the spring 49 if necessary when the caging parts of the gyrocompass are engaged.

The directive or sensitive element of the improved gyrocompass is a liquid tight assembly 50 that floats in the liquid 11 with its center of gravity below its center of buoyancy. The configuration of the assembly 50 is that of a hollow cylinder 51 with end closing plates 52, 54 that floats in the liquid 11 as described with its longitudinal axis coincident with axis 14 of the liquid chamber 12. As shown, the assembly or directive element 50 includes a gyroscopic rotor 55, FIG. 1(b) with a normally horizontal and North-South spin axis 56. Rotor 55 is spun by an electric motor 57 of a conventional A.C. induction type that is operatively connected thereto. In the specific structure shown, the wound stator of the motor 57 is fixedly mounted on a stub shaft and the magnetic rotor part of the motor is fixedly connected to the gyroscopic rotor per se. As an integral component of assembly 50 the gyroscopic rotor 55 and motor 57 elements are parts of an independent housing 58 fixedly mounted on the end plate 52 providing a helium filled enclosure 59 within assembly 50.

The structure within cylinder 51 also includes an electrical source located in a housing 61 fixedly mounted on the end plate 54. The source may be a rechargeable D.C. battery 60 of the silver-cadmium type. An electrical package 62 that includes a suitable oscillator 64, FIG. 4, and a suitable voltage regulator 65 is fixedly connected to the bottom of the housing 58. In the indicated circuit, the D.C. output of the battery 60 is converted by the regulator 65 and oscillator 64 to A.C. power usable by the motor 57. The improved structure also includes a means for operating the electric motor 57 of the combination from the battery 60 when the parts of the improved gyrocompass are uncaged and accordingly conditioned for operation with the handwheel 24 in the position shown in FIG. 1(b). This operating means structure includes a circuit with an off-on switch 66 fixed to a compass plate 53 on the top of the float element 50 whose blades as a part of plunger 67 are normally biased to a closed condition by spring 68 as shown in FIG. 4. The closed circuit between the battery 60 and motor 57 includes leads 69, 70 from the battery to the switch, leads 71, 72, from the switch 66 to the voltage regulator of the package 62, leads 73, 74 from the regulator 65 to the oscillator 64 and leads 75, 76 from the oscillator to the stator windings of the motor 57. In caged condition, the plunger 67 engages the disc 33 of the binnacle 10 to overcome the bias of the spring 68 and open condition the on-off switch 66.

The caging structure of the directive element for assembly 50 of the caging means includes movable cage parts indicated as flange 77 on the rim of end plate 52 and conical piece 78 fixed to the bottom of the end plate 54. In caging the float element 50 to the binnacle 10, the handwheel 24 is turned manually to move cup 21 to engage a fixed threaded piece 79 with the core centered in the cup and raise the float element 50 with respect to both the binnacle and liquid until the flange 77 engages the ring 37. In caged condition, the circuit to the motor 57 is open and the parts are secured with respect to one another so that the binnacle or housing 10 can be transported, mounted on and dismounted from the base plate 16 without damage to the directive element. The adjusting means for engaging the cage parts of the housing or binnacle and directive assembly also conditions the switch in the circuit between the battery 60 and motor 57 in open condition.

The combination structure also includes a circuit between the battery 60 or electrical energy source carried by the float assembly 50 and the housing or binnacle 10 having a second off-on switch 80 with a part fixed to the compass plate 53 whose respective biased fingers engage the circular conductive tracks 34, 35 on disc 33. In the operative condition of the improved gyrocompass as shown in FIGS. 1(a) and 4, the parts are separated and the circuit is open. The parts of the switch 80 are engaged by the adjusting means of the combination when the caging parts 77 and 37' of the housing and assembly are engaged. The level of the liquid 11 is below the caging parts 37, 52 to isolate the switches 66 and 80 from the liquid when the caging parts are engaged through annular seal 37' and the respective switches are closed and open. As shown in FIG. 4, leads 81, 82 connect the electrical socket 36 to the tracks 34, 35 on disc 33 so that the battery 60 may be recharged between usages with the float element 50 caged to the binnacle 10 and with a suitable charging D.C. supply being plugged into the socket. Here, the closed circuit further includes leads 84, 85 between the parts of switch 80 on the plate 53 and the respective battery leads 69 and 70.

The part of the coupling means included in the improved combination on the floating assembly or directive element 50 is provided by a magnetizable piece magnetized by the magnet 48 such as an iron ball or sphere 86 that is located on the top of the end plate 52. The coupling prevents the floating assembly from contacting the inner wall of the binnacle chamber 12 to maintain the piece 86 centered on the axis 14 without introducing unwanted torques. Any tendency of the assembly to depart from a centered condition is corrected by a horizontally directed force due to the unbalance in the reaction between the line flux field of the magnet and the radial flux field of the center of the ball.

In the improved combination, there is no mechanical connection between the assembly 50 and the binnacle 10. The directive element 50 is designed to float in the liquid 11 without friction in a partially submerged condition with its center of gravity below its center of buoyancy. The angular momentum of the gyroscopic rotor 55 and the pendulosity of the assembly 50 are chosen so that the axis 56 of the rotor 55 settles in a North-South direction relatively quickly after the instrument is uncaged for use. The liquid 11 of the combination also provides the requisite damping for the pendulous directive element or assembly 50. In operation, the magnetic coupling maintains the assembly 50 free from the binnacle 10 with the magnetized piece 86 on the normal vertical center line 14.

Adjustable arms 87, 88 may be located on the bottom end plate 54 of assembly 50 to balance the pendulous assembly 50. After the required settling period, the angular relation between assembly 50 and the housing is observed on the eyepiece of the telescope 17 through an optical path that includes prism 45 and one of four reflecting prisms 90, 91, 92 and 94 mounted in the top end plate 52, FIGS. 1(a) and 3. North prism 90 is observed with corresponding line indicia on the side of the compass plate 53. The related East-South and West prisms 91, 92 and 94 have corresponding indicia located on the side of the plate 53 that is observed with the proper orientation of the binnacle in the base plate. Directional indicia (W) and line are specifically shown on the compass plate 53 in FIG. 5. Where for example a North direction is derived from a given point of observation, the tripod is mounted at the point with base plate 16 level and the binnacle is mounted therein within the telescope 17 directed approximately North. The improved gyrocompass float assembly 50 is then uncaged by turning the handwheel 24 so that the assembly floats in the liquid 11 free of the binnacle with the gyroscopic rotor 55 spinning. After the required short settling time has elapsed, the North line indicia in plate 53 and the autocollimated return image from prism 90 are observed at the eyepiece with the telescope 17 directed at the prism 45. To move the telescope 17, arm 44, prism 45 and cover 28 about axis 14 with respect to element 50 so that the line of sight is normal to the axis of prism 90 the fastening 42 is loosened and knob 38 is turned until this result is obtained. The fastening 42 is retightened and the telescope is now sighted in a North direction from the observation point. The instrument is operated in a similar manner where the initial directed approximations are East, South or West.

What is claimed is:

1. A stationary gyrocompass for providing a directional reference for a portable theodolite or the like comprising,
    (a) an elongated cylindrical binnacle enclosure adapted to be supported by said theodolite with its major axis vertical and having an internal annular flange of reduced diameter dividing said binnacle into upper and lower compartments,
    (b) a gyroscopic sensitive element comprising an elongated cylindrical member adapted to nest within said binnacle and including top and bottom covers forming a fluid tight housing, said top cover having an upwardly extending portion of reduced diameter adapted to fit within the reduced diameter of said binnacle flange and providing a shoulder of greater diameter below said flange, said sensitive element comprising a gyroscopic rotor, a drive motor therefor and a power source for said motor including a rechargeable battery,
    (c) electrical contact means carried by said binnacle and the top cover of said sensitive element and located within said upper compartment and adapted when closed to connect an external power supply with said battery,
    (d) a flotation fluid in said lower binnacle portion for supporting said sensitive element therein in a partially submerged condition whereby said reduced portion thereof extends within said upper compartment, and
    (e) caging means carried by said binnacle and adapted when operated to move said sensitive element toward said upper compartment to an extent that said contacts are closed and said sensitive element shoulder contacts said binnacle flange whereby to seal said fluid within said lower compartment under caged conditions and isolate said contacts from said fluid when recharging said battery 2. The gyrocompass as set forth in claim 1 further including optical reference members normally cooperable with said theodolite and carried on said sensitive element upper cover and within said upper chamber whereby to be isolated from said flotation fluid under caged conditions.

3. The gyrocompass as set forth in claim 1 further including means maintaining said sensitive element vertically aligned with said binnacle axis comprising cooperable magnet and magnetizable components mounted on said binnacle and sensitive element upper cover, said components being separated by a small gap during normal operation of said gyrocompass and becoming engaged upon caging of said sensitive element.

References Cited
UNITED STATES PATENTS

| | | | |
|---|---|---|---|
| 1,180,815 | 4/1916 | Anschutz-Kaempfe | 33—226 X |
| 1,589,039 | 6/1926 | Anschutz-Kaempfe | 33—226 |
| 3,001,290 | 9/1961 | Rellensmann et al. | 33—72 |
| 3,068,583 | 12/1962 | Goshen | 33—206 X |
| 3,162,951 | 12/1964 | Hintze et al. | 33—72 |
| 3,174,346 | 3/1965 | Hintze et al. | 74—5.1 X |
| 3,273,404 | 9/1966 | Ehrick | 74—5.7 X |

FOREIGN PATENTS 1,143,036  1/1963  Germany.

ROBERT B. HULL, *Primary Examiner.*

U.S. Cl. X.R.

33—72